June 15, 1948.  F. H. HAGNER  2,443,240
PLOTTING AND MEASURING DEVICE
Filed May 17, 1943  3 Sheets-Sheet 1
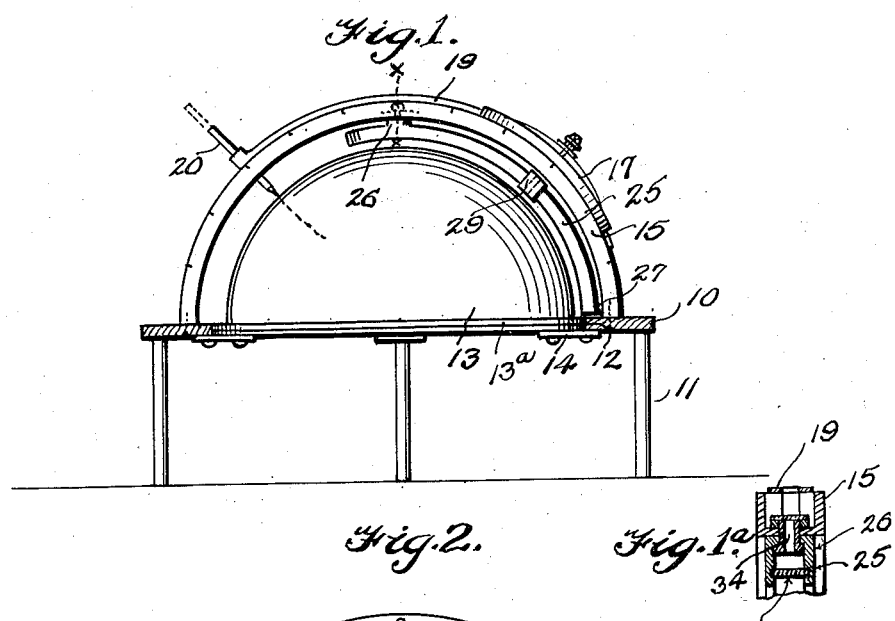
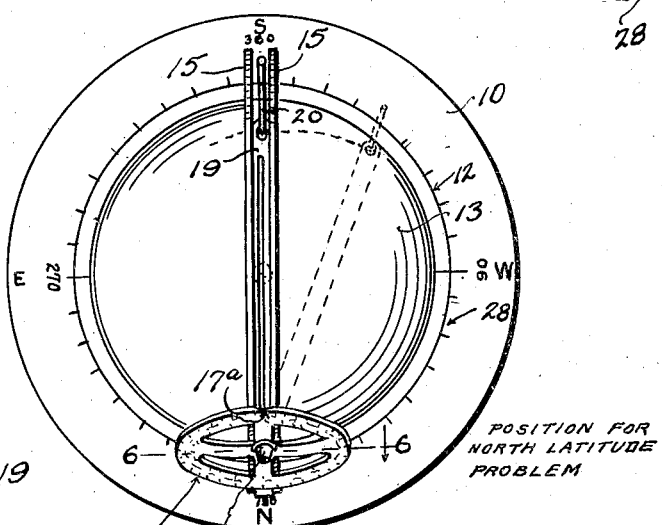
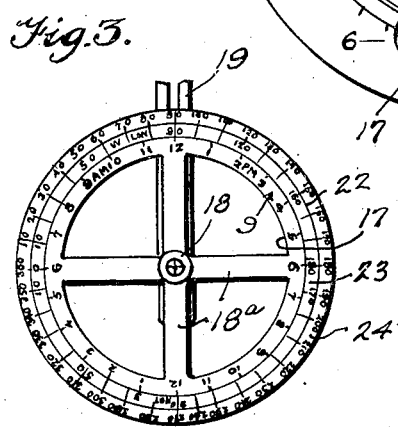
Inventor
FREDERICK H. HAGNER June 15, 1948.  F. H. HAGNER  2,443,240
PLOTTING AND MEASURING DEVICE
Filed May 17, 1943  3 Sheets-Sheet 2
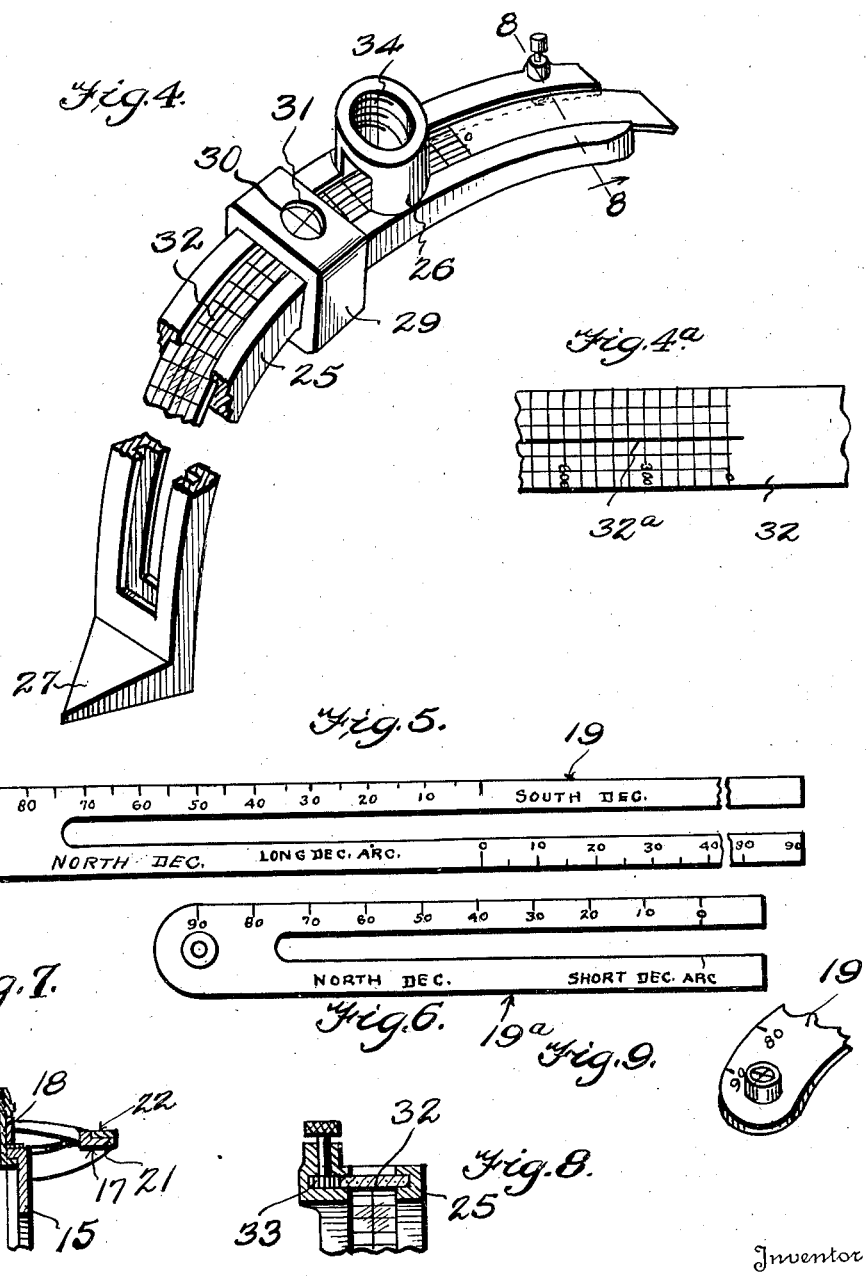

June 15, 1948. F. H. HAGNER 2,443,240
PLOTTING AND MEASURING DEVICE
Filed May 17, 1943 3 Sheets-Sheet 3

Inventor
FREDERICK H. HAGNER
By Irving R. McCathran
Attorney

Patented June 15, 1948

2,443,240

UNITED STATES PATENT OFFICE 2,443,240

PLOTTING AND MEASURING DEVICE

Frederick H. Hagner, San Antonio, Tex., assignor to Position Finder Corporation, San Antonio, Tex., a corporation of Texas Application May 17, 1943, Serial No. 487,373

4 Claims. (Cl. 33—21)

This invention relates to a plotting and measuring device, and has for one of its objects the production of a plotting and measuring device for facilitating the marking of a pre-computed curve upon a chart representing the path of a selected celestial body along a predetermined course for a given ground speed.

A further object of this invention is the provision of means for comparing the actual course of an airplane and the like, with the pre-computed plotted course.

Other objects and advantages of the present invention will appear throughout the following specification and claims.

In the drawings:

Figure 1 is a side elevational view of the plotting device;

Figure 1ª is an enlarged sectional view taken on line x—x of Figure 1;

Figure 2 is a top plan view;

Figure 3 is a top plan view of the rider, showing the graduations appearing thereon;

Figure 4 is a perspective view of the altitude arc;

Figure 10:
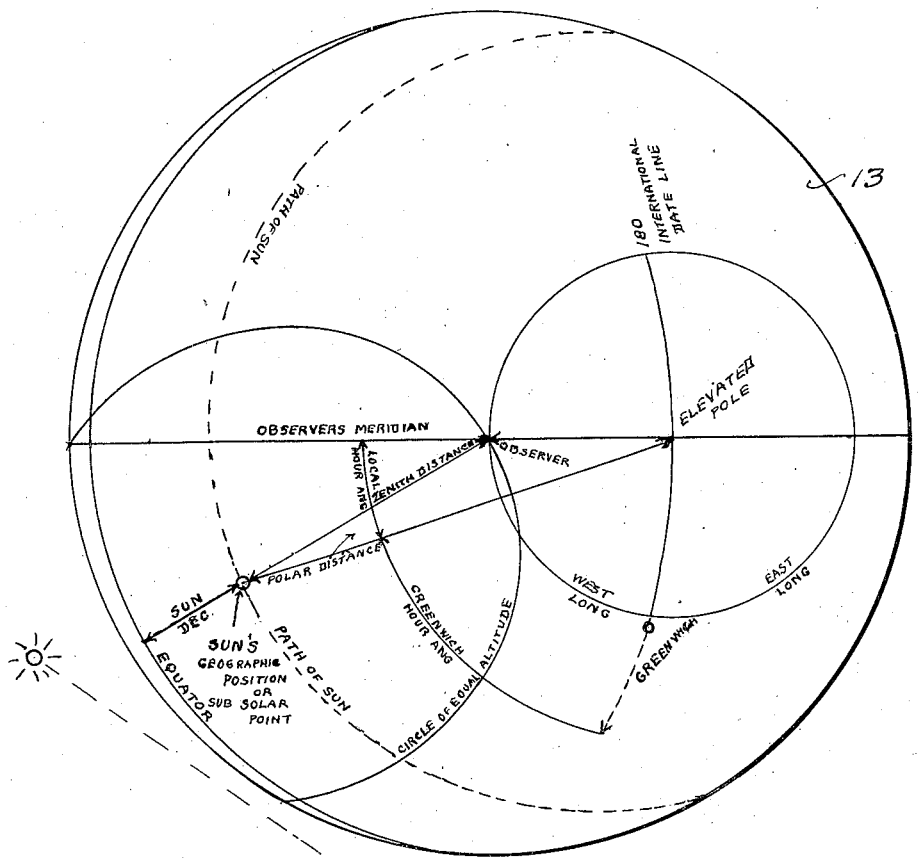
Figure 11:
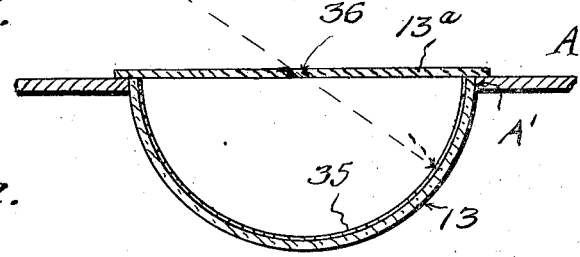
Figure 12:
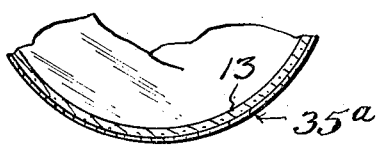

Figure 4ª is a fragmentary plan view of a portion of the scale carried by the altitude arc;

Figure 5 is a plan view of the long declination band;

Figure 6 is a plan view of the short declination band;

Figure 7 is a transverse sectional view through the altitude arc and rider;

Figure 8 is a sectional view taken on line 8—8 of Figure 4;

Figure 9 is a fragmentary perspective view of the outer end of the declination arc showing a reading glass in place of the pencil or other marking means;

Figure 10 is a plan view of a chart drawn upon the globe or other marking means;

Figure 11 is a sectional view of the globe placed in position for recording the course of the sun upon the inner face of the globe;

Figure 12 is a sectional view similar to Figure 11, showing a modified form wherein the sensitized material is applied to the outer face of the globe.

By referring to the drawings, it will be seen that 10 designates a supporting platform carried by legs 11. This platform 10 constitutes a horizon-indicating means and is provided with a central aperture 12 through which a transparent semisphere or globe 13 is inserted from the bottom and held in place by brackets 14. The upper face of the platform is graduated in an azimuth scale of 360°—see Figure 2.

A pair of upstanding spaced arches 15 are carried by the platform 10 and extend across the center of the platform from 0 to 180° of the azimuth scale. A rider 17 constituting a Greenwich hour angle circle and longitude circle is slidably mounted upon the upper edges of the arches 15, and may be locked in a selected position. This rider 17 may be rotated upon a bearing 18 and carries a selected declination band 19 or 19ª. The band 19 is slidable across the bearing and may be swung with the rider 17 to the dotted line or other selected position. The band 19 carries a marker 20 at its outer end which may be interchanged with a magnifying glass having a cross line for the purpose of a ready reference designated upon the semisphere 13 when the semisphere is properly oriented and in place. When desired, the short declination arc 19ª may be substituted for the long declination arc to facilitate the marking of a desired course on the globe 13. Each arc 19 and 19ª is longitudinally slotted to permit the same to slide by the bearing or post 18, while drawing a course in a desired position upon the globe 13. The declination band 19 is fitted in a notch 17ª formed upon the under side of the rider 17 so as to be locked therewith and to cause the band 19 to be swung as the rider 17 is turned or rotated. The rider 17 comprises a circular ring-like band which is supported by radiating arms 18ª. These arms 18ª converge at a hub which surrounds the bearing or hollow post 18—see Figure 3. The ring-like band of the rider 17 is graduated to indicate A. M. and P. M. time, as shown near its inner portion, as at 9. This band is provided with an inset ledge 21 upon which rests a ring 22. This ring 22 is provided with an inner graduated circle 23 indicating 180° east and 180° west, and an outer graduated circle 24 indicating 360° Greenwich hour angle.

An altitude arc 25 is hung on a fixed bearing 26 which constitutes the zenith-indicating means and indicates the observer's position upon the transparent semisphere 13 at a point just below the bearing 26. This bearing 26 is hung from the center of the arches 15—see Figure 1—and this arc 25 rotates 360°. A pointer 27 is carried by the lower end of the arc 25 and rides over the azimuth scale 28 on the platform 10. A rider 29 is slidable upon the arc 25 and is provided with an opening 30 having a cross reference line 31.

A chart strip 32 is slidable longitudinally of the arc 25, as shown in Figure 4, and is moved longitudinally by means of a wheel 33. This chart strip is divided transversely into degrees, as shown in Figure 4a, and with notations indicating miles, with every five degrees representing three hundred miles. The center line 32a represents the course and notations may be made upon either side of this line to indicate the divergence from the true course. By looking down through the opening 34 in the bearing 26, the pilot may determine the distance travelled by the reference line directly under the opening 34.

The instrument is set up as shown in Figure 1, and before taking off on a flight, the pilot sets the globe 13 inside the measuring device so that the North Pole on the globe is in columnation with the north point on the azimuth ring. The pilot sets the declination of a selected celestial body which he intends to use as his reference during flight on the axis of the elevated pole. This places the pencil 20 at the exact polar distance of the body. He then sets the longitudinal circle for his longitude of departure. For his Greenwich civil time of take-off, he takes the Greenwich hour angle from the Greenwich Almanac of the selected celestial body and sets this angle on the Greenwich hour angle circle. See Figure 3. The declination band 19 is then swung to the correct Greenwich hour angle. Then the pencil is engaged with the globe 13. This procedure is followed for every one hundred miles along this predetermined course, thereby indicating a dotted path of the celestial body as it will be seen along this course at a predetermined ground speed.

From the foregoing description it will be seen that by means of the above described instrument a precomputed course may be drawn upon the globe 13 as indicated in Figure 1, the proper measurement and location of the course being obtainable through the medium of the mechanism above described. After the course has been marked upon the outer face of the globe the globe 13 may be placed in position in the top of an airplane upon a support A as shown in Figure 11, the globe extending through the opening A', and being suspended by the base 13a which base carries a light entrance opening 36 at its extreme center. The light-sensitive material or coating 35 which is placed upon the inner face of the globe 13 is a photographic emulsion, and is adapted to photograph the light rays which project through the aperture 36 in the manner as indicated in Figure 11. As the airplane travels its course, the light rays from the sun or other heavenly body illustrated in Figure 11 will project through the aperture 36 and will be photographed upon the sensitized material 35, thereby defining a line along the inner face of the globe 13 which the pilot or aviator may observe to determine whether or not this line so photographed follows the precomputed course marked upon the outer face of the globe 13, and if the course actually being flown does not properly follow the precomputed course marked upon the outer face of the globe, the pilot may make his proper correction. The course marked upon the outer face of the globe will generally be in black, whereas the photographed course will be in brown thereby permitting the aviator to readily distinguish between the line of the precomputed course or the line of the sun, that is to say, the actual course being flown.

During flight should the pilot desire to properly locate any object viewed below such as a raft or life-boat adrift, he may mark the exact position of the sun upon the globe with a pencil or other means, making a note of the time and his elevation or altitude, and upon his return to base he may accurately locate the raft or life-boat within a small radius.

As shown in Figure 12, it will be seen that the sensitized material 35a may be placed upon the outer face of the globe 13, if desired.

Having described the invention, what is claimed is:

1. An instrument of the class described comprising a globe-like body having a spherical surface, horizon-indicating means for said body, a support arched over said body, a marker carried by said support and adapted to scribe a precomputed course upon said globe-like body, a pivot connecting the marker to the support for lateral swinging movement, said pivot being shiftable along said support, means for measuring the distance of movement of said marker from said horizon-indicating means as said marker is shifted along said arched support, a rider fixed to said marker and shiftably and pivotally movable with the marker to measure the distance of swing of the marker relative to the support, an altitude arc pivoted at the center of said arched support and having a pointer at its lower end, an azimuth scale located adjacent the horizon-indicating means, the pointer overlying the azimuth scale to indicate azimuth position, a graduated chart strip slidable longitudinally of the altitude arc to a selected position, sighting means carried by the altitude arc at its pivot, and a measuring slide movable upon the altitude arc and into a registering position with the precomputed course to facilitate the accurate positioning of the chart strip to determine distance between two selected points, distance traveled, and the like.

2. An instrument of the class described comprising a globe-like body having a spherical surface, horizon-indicating means for said body, a support arched over said body, a marker carried by said support and adapted to scribe a precomputed course upon said globe-like body, a pivot connecting the marker to the support for lateral swinging movement, said pivot being shiftable along said support, means for measuring the distance of movement of said marker from said horizon-indicating means as said marker is shifted along said arched support, a rider fixed to said marker and movable with the marker to measure the distance of rotation of the marker relative to the support, an altitude arc pivoted at the center of said arched support and having a pointer at its lower end, an azimuth scale located adjacent the horizon-indicating means, the pointer being mounted to swing freely over the azimuth scale to indicate azimuth position, a graduated chart strip slidable longitudinally of the altitude arc to a selected position, sighting means carried by the altitude arc at its pivot, a measuring slide movable upon the altitude arc and into a registering position with the precomputed course to facilitate the accurate positioning of the chart strip to determine distance between two selected points, distance traveled, and the chart strip being divided transversely into degrees with notations indicating miles and a longitudinal center line representing the course to be followed.

3. An instrument of the class described comprising a globe-like body having a spherical surface, horizon-indicating means for said body, a support arched over said body, a marker carried by said support and adapted to scribe a precomputed course upon said globe-like body, a pivot connecting the marker to the support for lateral swinging movement, said pivot being shiftable along said support, means for measuring the distance of movement of said marker from said horizon-indicating means as said marker is shifted along said arched support, a rider fixed to said marker and movable with the marker to measure the distance of swing of the marker relative to the support, an altitude arc pivoted at the center of said arched support and having a pointer at its lower end, an azimuth scale located adjacent the horizon-indicating means, the pointer being mounted to swing freely over the azimuth scale to indicate azimuth position, a graduated chart strip slidable longitudinally of the altitude arc to a selected position, sighting means carried by the altitude arc at its pivot, a measuring slide movable upon the altitude arc and into a registering position with the precomputed course to facilitate the accurate positioning of the chart strip to determine distance between two selected points, distance traveled, the chart strip being divided transversely into degrees with notations indicating miles and a longitudinal center line representing the course to be followed, and a traction wheel engaging the edge of said chart strip for moving the strip longitudinally of the altitude arc.

4. An instrument of the class described comprising a globe-like body having a spherical surface, horizon-indicating means for said body, a support arched over said body, a marker carried by said support and adapted to scribe a precomputed course upon said globe-like body, a pivot connecting the marker to the support for lateral swinging movement, the pivot of said marker being shiftable along said support, means for measuring the distance of movement of said marker from said horizon-indicating means as said marker is shifted along said arched support, a rider fixed to said marker and movable with the marker to measure the distance of swing of the marker relative to the support, said pivot constituting a shiftable pole, a zenith-indicating means fixed relative to said globe-like body, said rider having a ring-like band graduated to indicate A. M. and P. M. time, a graduated ring rotatable upon the band, said band having inner and outer concentric graduations, the inner graduations being 180° east and 180° west longitude, the outer graduations being 360° Greenwich hour angle, and said marker comprising a suitable graduated strip to indicate degrees of declination.

FREDERICK H. HAGNER.

REFERENCES CITED

The following references are of record in the file of this patent:

UNITED STATES PATENTS

| Number | Name | Date |
| --- | --- | --- |
| 20,506 | Oakes | June 8, 1858 |
| 1,016,176 | Roca | Jan. 30, 1912 |
| 1,175,612 | Cresse | Mar. 14, 1916 |
| 2,205,357 | Hagner | June 18, 1940 |